June 30, 1970        G. N. ADAMS        3,518,022

PROPELLER CONTROL MECHANISM

Filed April 9, 1968        4 Sheets-Sheet 2

INVENTOR
GLENN NELSON ADAMS

BY Cushman, Darby & Cushman
ATTORNEYS

United States Patent Office 3,518,022
Patented June 30, 1970

3,518,022
PROPELLER CONTROL MECHANISM
Glenn N. Adams, Montreal, Quebec, Canada, assignor to Canadair Limited, Montreal, Quebec, Canada
Filed Apr. 9, 1968, Ser. No. 719,937
Int. Cl. B63h 3/10
U.S. Cl. 416—27                                   16 Claims

ABSTRACT OF THE DISCLOSURE

An improved system for controlling the pitch angle setting of propeller blades. The pitch angle setting of the propeller blades is the result of two contributions. The first contribution is provided by the output of the propeller constant speed unit while the second contribution varies in accordance with the power setting of the engine used to power the propeller. These two contributions are combined in a mechanism constructed and arranged such that the effect on propeller blade pitch setting of said second contribution gradually decreases substantially in conjunction with a progressive increase in propeller translational velocity which results in tentative increase in the propeller rotational speed.

---

This invention relates generally to a control system for a propeller or the like, and more particularly to an improved system for controlling the pitch angle setting of propeller blades.

This invention has particular utility and is designed primarily for employment with VTOL tilt-wing or tilt-rotor aircraft capable of vertical take-off and landing and in-flight transition for forward cruise flight as a conventional fixed-wing aircraft.

The thrust produced by an aircraft propeller and the power absorbed by it depend on the pitch setting of the blades, the rotational speed, and the translational velocity of the propeller through the air. In order for the propeller to absorb the same power, at a given rotational speed, when the translational velocity is increased, it is necessary that the pitch setting be increased by the correct amount. The converse is true if the translational velocity is decreased. The usual propeller governor or "constant speed unit" does this.

During take-off, landing and/or hovering in an aircraft that uses modulation of propeller thrust, for control purposes it is important that the propeller pitch setting be changed quickly and accurately in relation with changes in the power setting of the engine. One way of achieving this is to provide a scheduling mechanism that introduces an approximately correct change of pitch setting when the power setting is altered. In such case the propeller governor performs a trimming function, adjusting the pitch setting to the correct value.

It is a well-known characteristic of propellers that the rate of change of power required to drive the propeller per unit change of propeller blade pitch setting becomes increasingly greater as the translational velocity of the propeller through the surrounding media increases. Hence the scheduling referred to above must be faded out with increasing translational velocity and gradually reintroduced with decreasing translational velocity, as for take-off and landing respectively. This can be accomplished by an action of the pilot, thus complicating his task. In the case of a tilt-wing aircraft it can also be accomplished by means of a fade-out mechanism actuated by wing tilt. This adds to the complexity of the control system; it furthermore means that the fading-out of the scheduling function is accomplished at a relatively low translational velocity of the propeller when the wing is fully tilted down whereas it would be preferable for the fading-out to take place gradually over the translational velocity range.

This invention takes advantage of the fact that pitch setting is normally increased with increasing translational velocity. This increase in pitch setting, brought about by the action of the propeller governor, in a specific embodiment to be described hereinafter, alters the configuration of a summing linkage in such a way that the contribution to pitch setting arising from the scheduling of pitch setting with selected engine power is progressively and automatically faded out. The system is arranged such that such fading out occurs gradually over the translational velocity range, without requiring any action by the pilot.

Accordingly, the chief object of the invention is to provide an integrated system for controlling propeller blade pitch setting and speed of rotation of an engine driven propeller or propellers automatically, wherein one contribution to blade pitch setting is related to selected engine power, said system so arranged that said one contribution is reduced gradually and automatically as the translational speed of said propeller relative to a fluid medium surrounding the same increases.

Further important objects of this invention include the provision of an improved thrust control system for propellers; the provision of means in a control system for automatically regulating propeller pitch under predetermined flight conditions; the provision of means in a propeller thrust control system for regulating propeller pitch in accordance with changes in selected engine power, in order to provide rapid thrust response wherein means is provided for automatically fading out said regulation of propeller pitch in accordance with increases in selected engine power as translational speed increases; and the provision of a simple thrust control system for propellers or the like which is particularly useful with VTOL tilt-wing or tilt-rotor aircraft.

The above mentioned objects and other objects and advantages of the invention will become apparent from a study of the following specification, taken in conjunction with the accompanying drawings, in which like reference characters indicate corresponding parts throughout the several views and in which:

Figure 1:
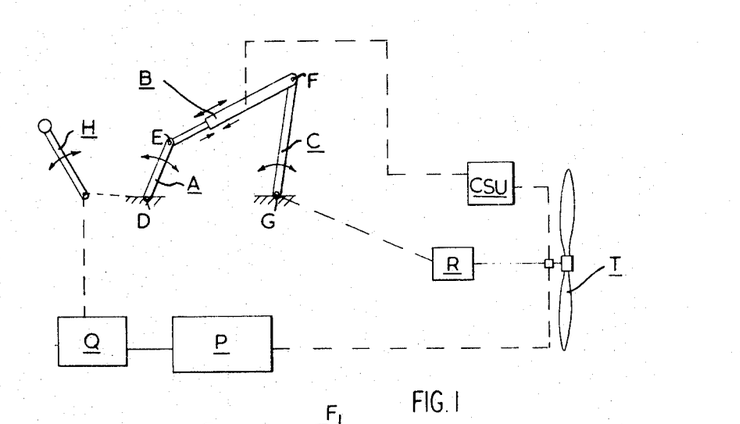
FIG. 1 illustrates schematically the application of one embodiment of the invention to a propeller control mechanism.

Referring now to FIG. 1 there is shown a conventional variable pitch propeller T, the latter being connected to a conventional source of engine power P. The power output of the engine P is controlled by the pilot via the pilot's power lever H mounted in the cockpit, the latter being connected through suitable linkage to the engine fuel control unit Q.

The system of FIG. 1 includes a propeller governor or constant speed unit commonly abbreviated CSU the latter being sensitive to the rotational speed of propeller T. The blades of propeller T are also connected to a suitable pitch change linkage shown schematically at R so that the pitch of the propeller blades may be varied.

The system of FIG. 1 is so constructed and arranged that the blade pitch setting of propeller T is determined by two contributions. One contribution to propeller blade pitch setting is provided by the CSU which acts in conjunction with the propeller and its drive engine to increase the blade pitch setting as the propeller translational velocity increases and vice versa. The way in which this is achieved is well known in the art. If, for example, the translational velocity of an aircraft increases, the power required to drive the propeller, assuming for the moment that blade pitch is constant, decreases. As soon as the power required to rotate the propeller decreases the power delivered by the engine becomes greater than the power required to rotate the propeller and this surplus power immediately begins to increase the rotational speed of the propeller, but the CSU immediately senses this "tentative" increase in propeller rotational speed and responds by increasing the propeller blade pitch with the result being that the power required to drive the propeller increases thus resulting in a slight slowing down of the propeller until an equilibrium condition between the power delivered and the power required is reached with the blade pitch setting being maintained by the CSU at a value which will permit the engine to drive the propeller at the desired rotational speed. From the above it will be seen that while the CSU per se is only capable of sensing propeller rotational speed changes, the combination of the CSU with the variable pitch propeller and its drive engine is actually responsive to changes in the translational velocity of the propeller relative to the surrounding fluid medium. It is also noted here that the rotative speed changes in the propeller are normally quite small since the CSU is sufficiently sensitive as to effect a change in blade pitch before the rotative speed change becomes substantial. These small rotational velocity changes are referred to herein as "tentative" rotational velocity changes. The second contribution to propeller blade pitch setting is related to the power setting of the engine P as determined by the fuel control lever setting H, and the system of FIG. 1, in accordance with the present invention, is arranged such that the contribution to blade pitch setting related to selected engine power is reduced automatically as the translational speed of said propeller relative to a fluid medium surrounding the same increases and vice versa. In order to provide the action described above, the system of FIG. 1 includes a motion summing device in the form of three interconnected members A, B and C. The elongated members A and C are pivoted about fixed points D and G respectively. Member B is extensible and pivotally interconnects the elongated members A and C at pivot points E and F respectively. The distance between the pivots E and F and the fixed pivot points D and G respectively will depend on the particular application of such motion summing device as will be seen more fully hereinafter.

The member A is interconnected to the power control lever H and hence receives an angular input via suitable linkage means which is in appropriate correspondence with the selected value of engine power. Since the free end of member A is linked to the free end of member C by the member B, rotation of member A caused by movement of the engine power control lever H will in most cases cause the member C to rotate through an angle depending upon the configuration of the motion summing linkage. The member C is connected by suitable linkage means to the pitch change linkage bar. Hence rotary motion of member C transmitted via member B from member A, will be converted by suitable linkages, cams, etc. into propeller blade pitch setting.

As was mentioned above, the member B is extensible. In accordance with the invention, the propeller constant speed unit (CSU) is connected to the member B in such a manner that the tentative changes in propeller rotational speed sensed by the CSU determine the length of the member B. Hence, as the rotational speed of the propeller change, the extensible member B will be varied in length, thereby varying the geometry of the linkage members A, B and C of the motion summing device. The manner in which the geometry of the motion summing members A, B and C is changed in order that the contribution to propeller blade pitch setting arising from selected engine power be progressively faded out as a propeller translational velocity increase resulting in tentative propeller rotational speed increase takes place will now be described with particular reference to FIGS. 2–7.

Figure 2:
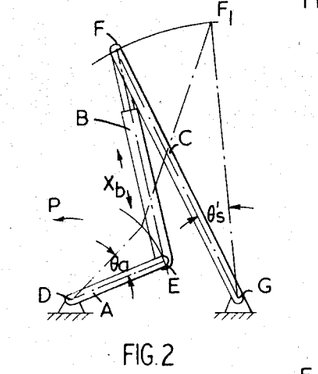
FIG. 2 shows a schematic illustration of a first embodiment of a control linkage mechanism shown in the low translational velocity condition.
Figure 3:
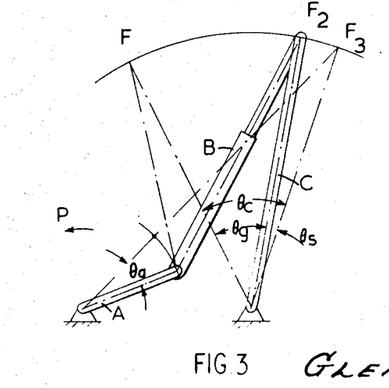
FIG. 3 shows the same embodiment as in FIG. 2 but in higher translational velocity condition.

Referring now to FIG. 2 in particular it will be seen that at low translational velocity resulting in tentative increase in the propeller rotational speed rotation of member A in the direction of arrow P through the angle $\theta_a$ causes member C to rotate through the angle $\theta'_s$ with the end of the latter describing the arc F–F$_1$. Extension X$_b$ of member B (which in the embodiment of FIGS. 2 and 3 takes place with an increase in translational velocity), while the member A is stationary, causes rotation of the member C, e.g. through the angle $\theta_g$, with its end F describing the arc F–F$_2$ as shown in FIG. 3. A change of engine power causing rotation of the member A in the direction of the arrow P through the angle $\theta_a$ will now cause rotation of the member C through angle $\theta_s$ from F$_2$ to F$_3$ with the propeller pitch setting corresponding to the sum $\theta_c$ of contributions $\theta_s$ and $\theta_g$ depending on the selected engine power and on the action of the CSU. From FIGS. 2 and 3 it can be seen that since increasing translational velocity causes extension of the member B, thus causing members B and A to become nearly colinear, the dependence of pitch setting on power setting fades out (angle $\theta_s$ being a fraction only of the angle $\theta_a$).

Figure 4:
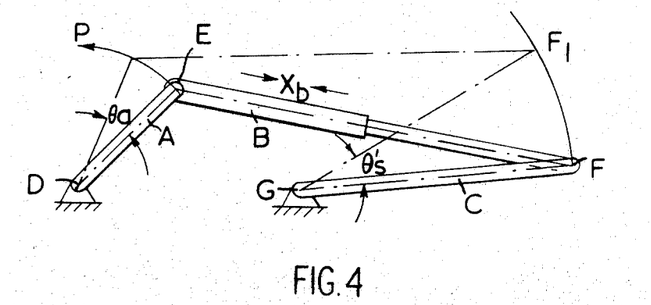
FIGS. 4 and 5 show corresponding configurations of an alternative arrangement in which a variable length linkage decreases its length with increase of translational velocity.
Figure 5:
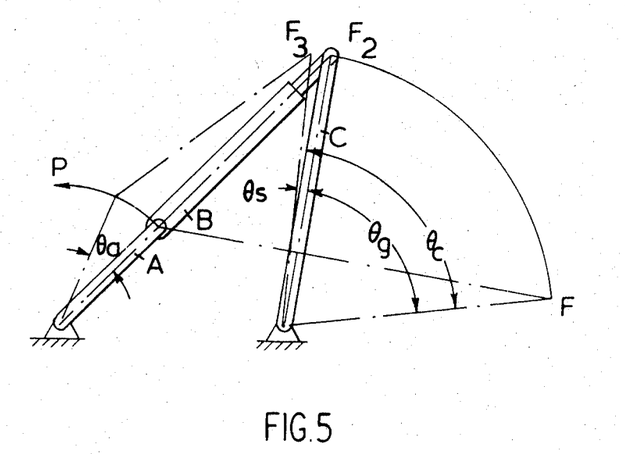

FIGS. 4 and 5 show corresponding configurations of an alternative arrangement in which member B decreases its length as translational velocity increases. FIG. 4 shows the configuration of motion summing the linkage at relatively low translational velocities when the link B is in a relatively extended condition. When motion summing the linkage is in the condition shown in FIG. 4, a change in engine power setting moving link A through an angle $\theta_a$ will result in a relatively large blade pitch change as represented by the angle $\theta'_s$. However, as the propeller translational velocity increases, the action of the CSU causes the member B to decrease in length such that the motion summing linkage gradually assumes the condition shown in FIG. 5 with members A and B being shown in a substantially co-linear condition. With members A and B substantially co-linear as shown in FIG. 5, movement or change of the engine power setting as represented by $\theta_a$ results in only a very small change in the blade pitch setting as represented by small angular rotation $\theta_s$.

Figure 6:
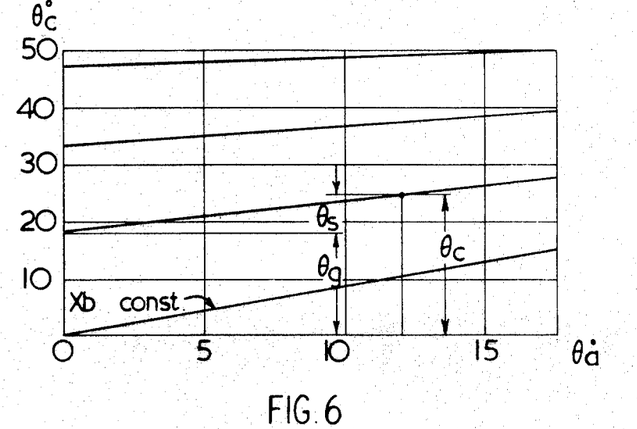
FIG. 6 shows a representative graph of the function between the input and the output.

The output angle $\theta_c$ is a function of the input angle $\theta_a$ and the extension X$_b$ of the member B. FIG. 6 shows a representative graph of this function, which will actually depend on the geometry of the linkage mechanism. Curves of $\theta_c$ versus $\theta_a$ are plotted for various constant values of X$_b$. A given value of $\theta_c$ may be considered to be the sum of a contribution $\theta_g$ caused by the governor (CSU) and a contribution caused by the schedule. When X$_b$ and $\theta_g$ are large, $\theta_c$ is relatively insensitive to change in $\theta_a$.

Figure 7:
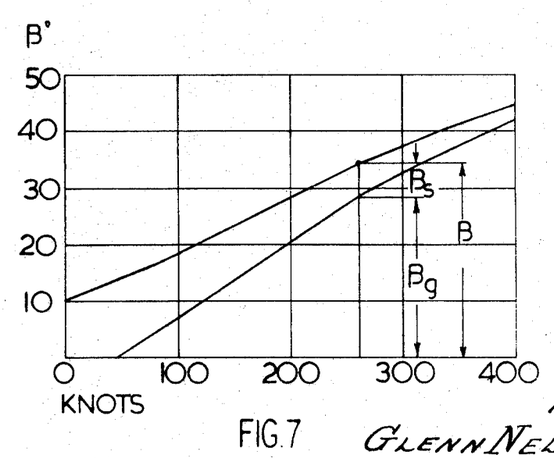
FIG. 7 shows a typical variation of the propeller pitch setting with translational velocity.

In FIG. 7 the upper curve shows a typical variation of the propeller pitch setting $\beta$ with translational velocity. The lower curve indicates the division into components $\beta_g$ corresponding to $\theta_g$, and $\beta_s$ corresponding to $\theta_s$. A sudden reduction of power at a high translational speed results in a relatively small reduction in pitch setting, thus avoiding the danger of propeller overspeeding that might result if the scheduled contribution $\beta_s$ to pitch setting had not been partly faded out.

This invention, therefore, results in the contribution to pitch setting scheduled with the engine power being gradually faded out as translational velocity increases, and faded in as translational velocity decreases without intervention of the pilot or any other aircraft variables, such as wing tilt, flap retraction, landing gear retraction, etc.

Any person skilled in the art will easily recognize that the relative angular orientations of the different members A, B and C of the motion summing means as well as their relative lengths must be determined to suit any particular application, in such a way that increases in engine power and/or in translational velocity will generally result in increasing propeller pitch, and as propeller pitch increases the contribution associated with engine power is progressively faded out. It will be apparent that if, for example, the input member A is allowed to rotate through a large angle, the contribution associated with engine power may change sense after being faded out. If this would be objectionable in a particular application, the geometry of the linkage mechanism must be chosen in such a way as to avoid it.

Figure 8:
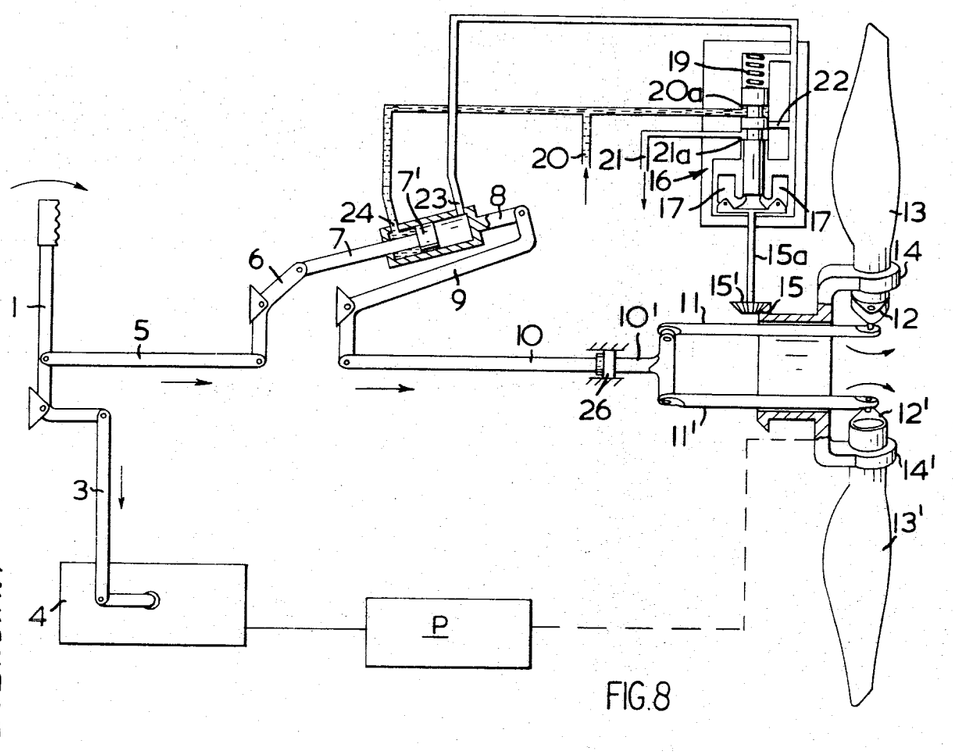
FIG. 8 shows a specific application of the propeller control mechanism.

FIG. 8 illustrates a particular application of the linkage mechanism shown in FIGS. 4 and 5 to a propeller control mechanism in an aircraft. FIG. 8 illustrates schematically an aircraft engine power plant P connected in a conventional manner for driving in rotation a variable pitch propeller having blades 13, 13'. The power output of the engine is controlled by the pilot via the pilot's power control lever 1, the latter being pivotally mounted in the aircraft cockpit and connected through a link 3 to an aircraft engine fuel control unit 4. The power control lever 1 is also connected through a link 5 to a bellcrank 6 pivotally mounted on the aircraft structure. It should be realized here that the bellcrank 6 corresponds to the member A of the motion summing device shown in FIG. 4. An extensible means comprising piston rod 7 slidably mounted within hydraulic cylinder 8, pivotally interconnects the free outer end of bellcrank 6 to a further bellcrank 9, the latter also being pivotally mounted on the aircraft structure. It will be realized here that the hydraulic cylinder 8 and piston rod 7 together correspond to the extensible member B of the motion summing linkage shown in FIG. 4 while the bellcrank 9 corresponds to the member C shown in FIG. 4. The hydraulic cylinder 8 is conventional in nature and is provided with ports adjacent its opposite ends thereby to permit hydraulic fluid to enter or leave the interior of the cylinder. Slidably mounted within the cylinder 8 and connected to the piston rod 7, is a piston 7'. Because of the presence of the piston rod 7, the effective area of piston 7' on the side thereof at which piston rod 7 is connected, is substantially less than the opposing side of the piston.

The bellcrank 9, whose rotation represents the output from the control mechanism, is linked via rods 10, 10' and 11, 11' to cranks 12, 12' attached to the root ends of the propeller blades 13, 13', the latter being rotatably mounted in retention bearings 14, 14'. A sliding bearing 26 permits rotation of the propeller blades 13, 13' relative to the rod 10.

Gears 15, 15' and shaft 15a transmit the speed of propeller rotation to a propeller governor or constant speed unit 16. Constant speed unit 16 includes flyball weights 17 pivotally mounted in the manner well known in the art and bearing on a valve spool 18. Valve spool 18 is biased in the axial direction by a spring 19, the latter being compressed as the flyball weights are swung outwardly from the axis of shaft 15a as propeller rotational speed increases and vice versa. The valve spool 18 is, as may be readily seen from the drawings, mounted within a valve casing having ports 20a, 21a and 22. As the valve spool 18 moves axially in response to changes in the centrifugal force on the flyball weights 17, and hence in response to changes in propeller rotational speed, the valve port 22 becomes connected either to a source of pressurized fluid 20 via valve port 20a or to a drain line 21 via valve port 21a. Port 22 is connected hydraulically via cylinder port 23 to the end of the hydraulic cylinder 8 corresponding to the large-area end of the piston 7'. The other end of cylinder 8 is connected hydraulically via port 24 to the aforementioned source 20 of pressurized fluid.

Because of the difference in effective area of the two sides of the piston 7', a pressure at port 23 substantially smaller than the pressure at port 24 will maintain a balance of forces. Thus, as the pressure at points 22 and 23 varies as a consequence of movement of the valve spool 18, there is an imbalance in the forces acting on the piston 7', thus causing the latter to move axially within the cylinder 8.

Assuming for the moment that piston rod 7 is held rigidly within cylinder 8, a movement of power lever 1 in the direction of the arrow, besides increasing the power setting of the engine, causes an increase in propeller pitch via members 5 to 12. Conversely, a movement of the power lever 1 in the opposite direction causes a decrease in engine power and in propeller pitch.

Any slight increase in propeller rotational speed, such as would result, for example, from an increase in aircraft translation velocity relative to the surrounding air, causes the flyball weights 17 to move outwardly of the axis of shaft 15a hence displacing the valve spool 18 upwardly against spring 19. This brings port 22 into communication with the drain line 21, leading to a decrease in pressure at port 23, with the piston rod 7 moving into the cylinder 8. Assuming that the power lever has been held rigid, this effective shortening of members 7 and 8 causes an increase in propeller pitch and the propeller tends to slow down due to the increased load thereon until it reaches the desired operating speed.

In the case of a decrease of propeller rotational speed such as would result, for example, from a decrease in aircraft translational velocity, the valve spool 18 moves downward bringing port 22 into communication with the hydraulic pressure supply 20, thus causing members 7 and 8 to extend with a resulting decrease in propeller pitch. The decrease in pitch reduces the power required to rotate the propeller, thus resulting in a speed increase in the latter until the propeller rotational speed reaches the desired valve. Hence, by suitably regulating the pressure at the port 23 the governor is able to maintain constant propeller speed.

As the aircraft translational velocity relative to the surrounding air speed increases, the propeller pitch must be increased in order to absorb the same power from the engine without an increase in propeller rotational speed. The governor does this by causing members 7 and 8 to shorten gradually. This shortening of members 7 and 8 brings them more nearly into line with member 6, and this reduces the effect of power lever movement on propeller pitch. When members 7 and 8 are colinear with member 6, the power lever movement has practically no effect on propeller pitch, i.e. the scheduled contribution to blade angle is faded out. The fading out of scheduled blade angle with increasing aircraft speed avoids the large changes in propeller rotational speed that would otherwise result if sudden movements of the power lever produced large changes in blade angle at high aircraft speeds of the aircraft relative to the surrounding fluid media.

The particular embodiment described above represents the system in its simplest form. The blade angle control mechanism according to the invention can be embodied in numerous other ways which will be evident to those skilled in the art. In particular, the power lever may control any number of engines by mechanical, electrical, hydraulic, or other means; the linkage from the power lever to member 6 may be arranged (for example by use of a cam) to provide whatever scheduled relationship of blade angle to power may be desirable in a particular application. The output from member 9 may be transmitted by any suitable means to any number of propellers, having any number of blades, and mechanisms may be incorporated to alter the pitch of individual propellers or individual blades relative to one another; the governor may incorporate refinements to improve its ability to regulate propeller rotational speed, and it may control the extension and contraction of members 7 and 8 by electrical, pneumatic, or other means. More than one governor may be used, for reliability, with provisions for switching from one to another.

It should also be understood that, while the embodiments disclosed herein relate particularly to control of aircraft propellers, the blade angle control mechanism according to this invention could also be used in conjunction with other applications of propellers, fans, blowers, etc. (for example in ships, wind tunnels, ventilating systems), in which it may be advantageous to alter the blade angle or otherwise change the configuration of the propeller, fan, blower, etc. as the relative velocity of the fluid flow changes.

It should further be understood that the blade angle control mechanism according to the invention could be used in applications such as windmills and turbines in which power is obtained from the fluid flow, instead of power being expended to cause the fluid flow.

I claim:

1. In an aircraft including an engine driven variable pitch propeller,
   (a) a governor sensitive to tentative rotational velocity changes in said propeller occurring due to changes in the relative translational velocity between the propeller and the surrounding fluid medium and producing a first pitch control contribution in response to said changes,
   (b) a fuel control device for adjusting the power setting of said engine, said fuel control device arranged to provide a second pitch control contribution,
   (c) a mechanism associated with said governor and said fuel control device and adapted to combine said first and second contributions to pitch setting to produce a propeller pitch setting output, said mechanism comprising:
      (i) first and output links each mounted for pivotal motion about spaced axes,
      (ii) and an intermediate linkage interconnecting said first and output links at points spaced outwardly of the respective axes of pivoting of the first and output links,
   (d) means connecting said first link to said fuel control device so that said first link occupies angular positions determined by the power setting of said engine,
   (e) means operatively connecting said intermediate linkage to said governor to receive the first contribution thereof,
   (f) said intermediate linkage constructed and arranged to respond to said first contribution by changing the distance between said points which are spaced outwardly of the respective axes of pivoting of the first and output links in a sense as to cause said points spaced outwardly to move gradually into alignment with the pivot axis of said first link due to the action of the governor means in response to a gradual increase in said relative translational velocity,
   (g) and means connecting said output link to said propeller to transmit propeller pitch changing motion thereto.

2. The system according to claim 1 wherein said intermediate linkage comprises an extensible link.

3. The system according to claim 2 wherein said first contribution to propeller pitch setting is in the form of a fluid pressure signal controlled by said governor, and wherein said extensible link comprises a cylinder having piston and rod means slidably mounted therein so that the length of the extensible link changes when movement of the piston and rod means within the cylinder takes place, and wherein the operative connection between the governor and the extensible link includes means for connecting said cylinder to receive said fluid pressure signal whereby the length of said extensible link changes in accordance with changes in said fluid pressure signal.

4. In an aircraft including an engine driven variable pitch propeller having a pitch change mechanism associated therewith, governor means arranged to sense tentative rotational speed changes of the propeller and adapted to respond to such changes by producing an output which varies in accordance with such tentative rotational speed changes, and a fuel control means for varying the power setting of the engine, the improvement comprising: a first pivotally mounted link including means operatively connecting said first link to said fuel control means whereby the angular position of said first link is determined by the power setting of said engine, a further pivotally mounted link, means operatively connecting the further link to the pitch change mechanism of the variable pitch propeller, an extensible link pivotally interconnected between said first link and said further link whereby movement of said first link and/or length changes in said extensible link effect movement of said further link, means operatively connecting the output of said governor means to said extensible link with the latter being constructed such that it is caused to vary in length in response to variations in the output of said governor means with such length variations causing pivotal movement of said further link thereby to effect increase or decrease in the pitch of said propeller in such a manner as to substantially eliminate propeller overspeeding or underspeeding arising due to increases or decreases respectively in the relative translational velocity between the propeller and the surrounding fluid medium, with said governor means acting to progressively increase the pitch of the propeller blades as said relative translational velocity increases to maintain propeller rotational speed substantially constant at constant engine power setting, said first link, said further link, and said extensible link being so arranged relative to one another that as the length of said extensible link is changed due to the action of said governor means in response to an increase in said relative translational velocity, said first pivotally mounted link is brought gradually towards co-linear relation with said extensible link so that changes in the power setting of said engine, and hence in the angular position of said first link, have a gradually decreasing effect on the pitch setting of the blades of the variable pitch propeller.

5. The invention according to claim 4 wherein the governor has a valving means operatively connected thereto, a source of fluid pressure connected to said valving means, said extensible linkage comprising a cylinder and ram arrangement, said means operatively connecting said extensible linkage to said governor including conduit means linking said source of fluid pressure, via said valving means, to said cylinder and ram arrangement, said valving means being constructed and arranged such that in response to a tentative increase in propeller velocity sensed by said governor and arising as a result of an increase in said relative translational velocity said valving means admits fluid from said source to said cylinder and ram arrangement thereby to vary the length of the latter in a sense as to effect said change in distance between said outwardly spaced points.

6. The improvement according to claim 4 wherein said extensible link includes a cylinder having a piston slidably mounted therein and a piston rod connected to the piston and extending outwardly of the cylinder, said governor means having valving means operatively connected thereto, conduit means operatively connecting the valving means to the interior of said cylinder and to a source of pressurized hydraulic fluid, the governor means arranged such that the tentative rotational speed changes sensed thereby effect movement of the valving means to admit or release hydraulic fluid from said cylinder thereby to effect movement of the piston means to cause said variations in the length of said extensible link.

7. In a vehicle including an engine driven variable pitch propeller having pitch changing mechanism associated therewith,
   (a) a governor for sensing the rotational speed of said propeller and responding to tentative rotational speed changes resulting from changes in the translational velocity of the propeller relative to a surrounding fluid medium by producing a first contribution to propeller pitch setting;

(b) fuel control means for said engine arranged to provide a second contribution to propeller pitch setting;

(c) a summing device operatively connected to said governor and to said fuel control means and having as output the sum of the said first and second contributions, said summing device being constructed and arranged such that changes in the setting of said fuel control means have a progressively decreasing effect on said output as the first contribution provided by said governor changes in response to a tentative rotational speed change in said propeller arising from an increase in said relative translational velocity;

(d) and means for transmitting said output of the summing mechanism to the propeller pitch changing mechanism to vary the pitch of the latter in accordance with variations in said output.

8. The system as defined in claim 7 wherein said summing device comprises a motion summing linkage having a first link connected to said fuel control means to transmit motion in accordance with said second contribution to propeller pitch setting, an output link arranged to transmit motion representing said output of the summing means, and intermediate linkage means connected between said first link and said output link and having actuating means associated therewith connected to receive the first contribution to propeller pitch setting produced by the governor and constructed to respond thereto by altering the configuration of said linkage in a sense as to progressively reduce the degree of motion transmitted from said first link to said output link as said relative translational velocity increases.

9. The system according to claim 8 wherein said intermediate linkage comprises an extensible link.

10. The system according to claim 9 wherein said first contribution to propeller pitch setting is in the form of a fluid pressure signal controlled by said governor, and wherein said extensible link comprises a cylinder having piston and rod means slidably mounted therein so that the length of the extensible link changes when movement of the piston and rod means within the cylinder takes place and wherein the operative connection between the governor and the extensible link includes means for connecting said cylinder to receive said fluid pressure signal whereby the length of said extensible link changes in accordance with changes in said fluid pressure signal.

11. In an aircraft including an engine driven variable pitch propeller having a pitch change mechanism associated therewith, governor means arranged to sense tentative rotational speed changes of the propeller occurring due to changes in the relative translational velocity between the propeller and the surrounding fluid medium and adapted to respond to such changes by producing an output which varies in accordance with such tentative rotational speed changes, and a fuel control means for varying the power setting of the engine, the improvement comprising: a mechanism connecting said fuel control means to said propeller pitch change mechanism, whereby changes in the engine power setting may effect changes in the propeller blade pitch setting, means operatively connecting the output of said governor means to said mechanism with said mechanism being adapted to vary in configuration in response to said governor output in such a way as to transmit the governor output to the propeller pitch change mechanism thereby to effect changes in the propeller blade pitch in a sense as to substantially eliminate propeller overspeeding or underspeeding arising due to increase or decrease respectively in said relative translational velocity, said mechanism being further constructed and arranged such that as its configuration is progressively changed due to the action of said governor means in response to tentative propeller rotational speed change arising due to an increase or decrease in said relative translational velocity, the effect on propeller blade pitch setting arising due to changes in fuel control setting and hence engine power setting is progressively reduced or increased respectively.

12. The invention according to claim 11 wherein said mechanism comprises a motion summing linkage including a first link connected to said fuel control means, an output link connected to the propeller pitch change mechanism, and an intermediate linkage connected between said first and output links and being operatively connected to receive said governor output for actuation thereby, said intermediate linkage being arranged such that it alters the manner of interaction of said first and output links in a sense as to progressively reduce or increase the degree of motion transmitted from said first link to said output link thereby to produce said progressively reducing or increasing effect of fuel control setting on propeller blade pitch setting as said relative translational velocity increases or decreases respectively.

13. The invention according to claim 12 wherein said intermediate linkage comprises an extensible link.

14. The invention according to claim 13 wherein the output of said governor is in the form of a fluid pressure signal controlled by said governor, and wherein said extensible link comprises a cylinder having piston and rod means slidably mounted therein so that the length of the extensible link changes when movement of the piston and rod means within the cylinder takes place, and wherein the operative connection between the governor and the extensible link includes means for connecting said cylinder to receive said fluid pressure signal whereby the length of said extensible link changes in accordance with changes in said fluid pressure signal.

15. In a vehicle including an engine driven variable pitch propeller having pitch change mechanism associated therewith, a propeller pitch control system including: a translational velocity sensitive combination, said combination being constructed and arranged to produce a first pitch setting contribution, power setting means arranged to provide a second pitch setting contribution, a mechanism adapted to decrease the second pitch setting contribution in response to an increase in said first pitch setting contribution, said mechanism having a variable linkage operatively connected between said power setting means and the propeller pitch change mechanism, a first input element adapted to transmit the first pitch setting contribution of said combination to said variable linkage to cause variation thereof, a second input element adapted to transmit the second pitch setting contribution of said power setting means to said variable linkage, the latter being arranged whereby said first pitch setting contribution causes the variation of said variable linkage and said second pitch setting contribution responds to said variation such that a progressive increase in translational velocity of said propeller through a surrounding fluid medium resulting in tentative increase in the rotational speed of the propeller will cause a progressive decrease of the contribution to pitch setting by the power setting means.

16. In an aircraft including an engine driven variable pitch propeller, (a) means sensitive to changes in the relative translational velocity between the propeller and the surrounding fluid medium and producing a first pitch control contribution in response to said changes, (b) a fuel control device for adjusting the power setting of said engine, said fuel control device arranged to provide a second pitch control contribution, (c) a mechanism associated with said translational velocity sensitive means and said fuel control device and adapted to receive and combine said first and second contributions to pitch setting to produce a propeller pitch setting output, said mechanism comprising:
- (i) first and output links each mounted for pivotal motion about spaced axes,
- (ii) and an intermediate linkage interconnecting said first and output links at points spaced outwardly of the respective axes of pivoting of the first and output links,
- (d) means connecting said first link to said fuel control device so that said first link occupies angular positions determined by the power setting of said engine,
- (e) means operatively connecting said intermediate linkage to said translational velocity sensitive means to receive the first pitch control contribution produced thereby,
- (f) said intermediate linkage constructed and arranged to respond to said first pitch control contribution by changing the distance between said points which are spaced outwardly of the respective axes of pivoting of the first and output links in a sense as to cause said points spaced outwardly to move gradually into alignment with the pivot axis of said first link in response to a gradual increase in the relative translational velocity sensed by the translational velocity sensitive means,
- (g) and means connecting said output link to said propeller to transmit propeller pitch changing motion thereto.

References Cited
UNITED STATES PATENTS

| | | | |
|---|---|---|---|
| 2,710,068 | 6/1955 | Lindsey et al. | 170—135.74 |
| 2,777,525 | 1/1957 | Liaaen | 170—160.19 |
| 2,829,722 | 4/1958 | Best | 170—135.74 |

BENJAMIN W. WYCHE III, Primary Examiner

U.S. Cl. X.R.

74—516; 416—45, 163

PO-1050
(5/69)

UNITED STATES PATENT OFFICE
CERTIFICATE OF CORRECTION

Patent No. 3,518,022     Dated June 30, 1970

Inventor(s) Glenn Nelson ADAMS

It is certified that error appears in the above-identified patent and that said Letters Patent are hereby corrected as shown below:

In the above-entitled patent, please correct the same as follows:

Col. 1, following the line identifying the application serial number, please insert the following:

--Claims priority, application Canada, May 8, 1967, Ser. No. 989,925.--

SIGNED AND
SEALED
SEP 15 1970

(SEAL)
Attest:

Edward M. Fletcher, Jr.
Attesting Officer

WILLIAM E. SCHUYLER, JR.
Commissioner of Patents